United States Patent [19]

Duquette

[11] Patent Number: 4,865,067
[45] Date of Patent: Sep. 12, 1989

[54] FLUID CONSISTENCY REGULATING PUMP

[75] Inventor: John B. Duquette, Concord, N.H.

[73] Assignee: Crathern Engineering Co., Inc., Contoocook, N.H.

[21] Appl. No.: 313,382

[22] Filed: Feb. 21, 1989

[51] Int. Cl.$^4$ ............................................. G05D 24/00
[52] U.S. Cl. .......................................... 137/4; 137/92
[58] Field of Search ........................... 137/4, 92; 73/54

[56] References Cited

U.S. PATENT DOCUMENTS

| | | | |
|---|---|---|---|
| 1,985,312 | 12/1934 | Bryson | 137/92 X |
| 2,590,538 | 3/1952 | Huck | 137/92 |
| 3,632,700 | 1/1972 | Oglevee | 137/92 U X |

*Primary Examiner*—Alan Cohan
*Attorney, Agent, or Firm*—Schiller, Pandiscio & Kusmer

[57] ABSTRACT

A system for controlling the consistency of a material pumped from a reservoir, by introducing an alterant into the material, which system includes a diaphragm-type pump for pumping the material from a reservoir, the pump being driven by a double-acting air cylinder motor controlled by a pilot-operated two-position, four-way air valve having reducing valves connected at its air input ports to create pressure differentials between the input air and the operating air in the cylinder during steady state-operation of the pump. The motor is mounted so as to be relatively movable substantially toward and away from the pump responsively to change in the pressure differentials in the cylinder due to changes in the consistency. A compression spring, forming part of the mounting, is disposed so that under steady state conditions of consistency of material being pumped, an equilibrium exists between the forces acting between the motor and the pump, and the force acting on the motor by the spring, and the motor and pump do not move relatively to one another. A change in the consistency of the material will disturb that equilibrium, causing the motor to move relatively to the pump, and such movement serves to operate a valve that controls the introduction of alterant into the material.

13 Claims, 1 Drawing Sheet

U.S. Patent     Sep. 12, 1989     4,865,067
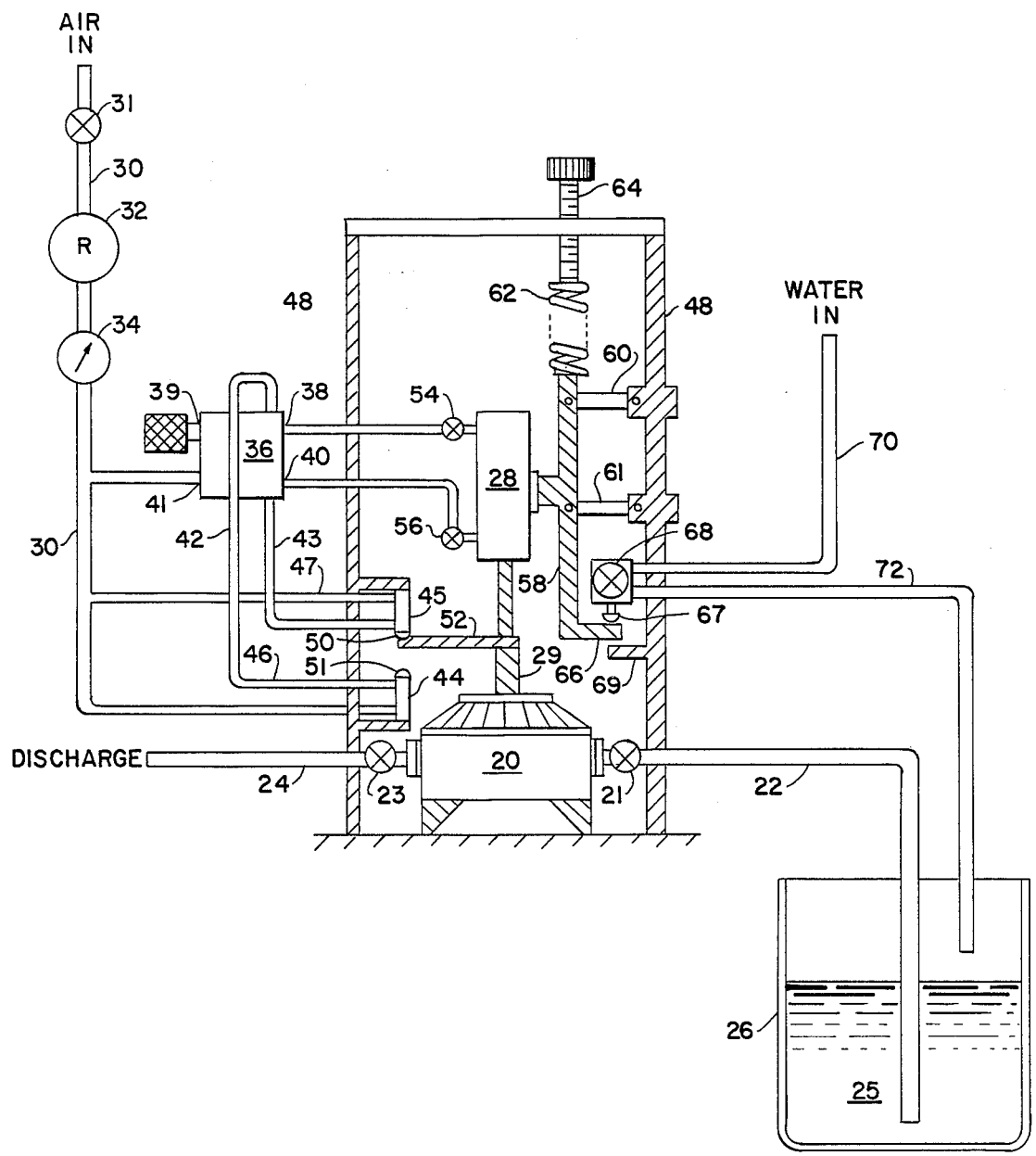

FLUID CONSISTENCY REGULATING PUMP

This invention relates to apparatus for and method of controlling the consistency of pumped materials, and more particularly the maintenance of a substantially constant consistency for the material being pumped.

The term "consistency" as used herein is intended to refer to the degree of firmness or resistance to movement or separation of constituent particles of the material being pumped, and is considered to include but be somewhat broader than the term "viscosity". The material being pumped, for purposes of this specification, includes, but is not limited to, fluids including liquids and mixtures of solids and fluids in which the fluid is either the suspending or the suspended phase and, therefore, includes slurries and colloids as well.

The control of the consistency of a pumped material is of substantial importance in many processes. This is particularly true, for example, with respect to gluing operations as in case-making and the like, where the glue is typically provided in large, solid, water-soluble chunks that are periodically dumped into a glue tank to be dissolved in water. Where the proportions of water and glue are not carefully controlled, or where there are substantial evaporative losses from an open glue tank, the consistency of the liquid glue can change quite quickly. Such evaporative losses are particularly prone to occur where the liquid glue is recirculated from applicator rolls back to the glue supply reservoir. For example, in an usual operation where the liquid glue is maintained at about 140° F., the evaporation rate of the solvent in a normal room temperature environment typically requires the machine operator to add thinner every half hour or so. It will be appreciated that such changes in the consistency of the liquid glue can result in either too much or too little glue being applied by the applicator device, or actually jam the pumping system and arrest operations until a proper flow of glue can be reestablished.

A number of systems have been developed for controlling the consistency of pumped fluids. For example, U.S. Pat. No. 1,374,286 is directed toward control of the flow of "stuff" (i.e., a paper pulp slurry) which is fed through a tube into a reservoir from which overflow is directed to a hinged trough. If the pulp is too viscous, it will tend to pile up in the trough and the increased weight of the pulp in the trough operates a valve permitting the flow of diluting water into the slurry tank.

U.S. Pat. No. 1,669,412 discloses a system for controlling pulp consistency through the use of a pair of conical floats mounted upstream and downstream of a point of entry of thinning water into a pulp flow stream. The differential response of the two floats to the respectively thicker and thinner streams controls the water supply to the system.

U.S. Pat. No. 2,773,507 discloses a technique of measuring torque which is proportional to the viscous drag on a rotatable element, the measured torque then being used to control the flow of a thinner.

U.S. Pat. No. 3,493,345 controls the viscosity of a polymer being pumped, the flow of additive being determined responsively to an electrical signal that is a function of the electrical power employed by the pump.

The foregoing prior art systems appear to provide control that is too inexact or too difficult to implement simply.

Other techniques control consistency by regulation of temperature such as in U.S. Pat. Nos 1,881,200. U S. Pat. No. 2,042,860 is essentially an improvement on the foregoing that includes a supplemental heater. Such temperature control systems are not particularly practical where the material, the consistency of which is being controlled, may have to flow sequentially through environments at several different process temperatures, or where the material being pumped does not change viscosity readily with temperature.

It is, therefore, desirable to have a simple but highly reliable apparatus and method for controlling the consistency of material, such as glue, being pumped to other processing equipment, by providing a controlled introducion of a consistency-altering substance into the material being pumped.

The invention accordingly comprises the several steps and the relation of one or more of such steps with respect to each of the others, and the apparatus embodying features of construction, combinations of elements, and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawing wherein there is shown a schematic diagram, partly in block, of apparatus for carrying out the process of the present invention.

To effect the foregoing and other objects, the present invention includes apparatus for and method of controlling the consistency of a pumped material by introducing a consistency-altering substance such as a thinner, thickener, solvent and the like (hereinafter termed an "alterant") into the pumped material. The foregoing apparatus includes pump means preferably comprising a positive displacement pump in the form of a diaphragm-type pump, for applying force, at some predetermined level, so as to pump the material at a predetermined flow rate from a reservoir, and means for driving the pump. Means are also provided for sensing change in the force applied by the driven pump to the pumped material to move the latter, valve means for controlling the flow of the alterant into the material, and means for controlling operation of the valve means responsively to the sensing of change in the force required to pump the material.

Referring now to the drawing, there will be seen apparatus for carrying out the process of the invention, which apparatus comprises pumping means formed of a positive displacement pump, preferably diaphragm pump 20. As is well known, the latter usually includes an elastic diaphragm (not shown), intake valve 21 connected to intake pipe 22, and discharge valve 23 connected to discharge pipe 24. Intake pipe 22 communicates with body 2 of material to be pumped located in supply vat or reservoir 26. It will be appreciated that other types of positive displacement pumps, such as reciprocating piston, gear and lobe pumps may also be used.

The pump means of the present invention also comprises means for driving pump 20, such means being in the form of motor 28 connected to the diaphragm of pump 20 through a coupling such as piston rod 29 so as to drive the diaphragm in reciprocation. In the preferred embodiment, motor 28 is a well-known double-acting pneumatic cylinder in which a piston (not shown) in the motor can be driven in reciprocation by alternating pneumatic pressure provided to opposite sides of the piston, rod 29 being, of course, connected to the piston.

A source of compressed gas (not shown) is connected to main supply line 30 through manually operable ball valve 31 and thence through regulator 32 that serves to control the pressure of compressed gas transmitted through line 30. The pressure thus controlled, in turn, controls the speed at which the pump cycles, and therefore controls flow volume through the pump. If desired, pressure gauge 34 can be installed in line 30.

The apparatus of the present invention is further provided with means, such as pneumatic valve 36, for driving motor 28 in reciprocation and thus, pump 20. Valve 36 is preferably a well-known, pilot-operated, two-position, four-way type of valve that comprises a pair of outlet ports 38 and 40, an inlet port or conduit 41 connected to line 30 for supplying compressed gas to valve 36, an exhaust port 39, preferably muffled, and the usual internal movable flow director (not shown). Because the flow director in valve 36 is pneumatically actuated, first control pneumatic inlet line 42 and second control pneumatic inlet line 43 are connected to provide gas flows for steering the flow director, and draw their gas supply from respective pilot valves 44 and 45 respectivly connected through lines 46 and 47 to line 30. In the form shown, pilot valves are mounted on frame 48 and disposed so that mechanical valve actuators 50 and 51 respectively thereof face one another along the same line. Arm 52 is mounted on and movable with rod 29 between extreme positions wherein it contacts a respective one of valve actuators 50 and 51, thus alternately turning each valve on when contact is made. Pilot valves 44 and 45 are typically spring loaded to be maintained in their closed position unless opened by contact with actuators 50 or 51. It will be appreciated, of course, that valve 36 can be mechanically or electrically actuated instead, in which case, arm 52 would serve to operate a mechanical linkage or a requisite electrical contact.

It will be apparent to those skilled in the art that if the consistency of the material being pumped changes, for example by being more or less resistant to pumping, to maintain the same pumped volume of that material, the force applied to the pump must also change accordingly. Of course, the force applied to the pump is exerted equally on the motor. Thus, of substantial importance then is the provision of means for sensing occurrence of such a change in the force applied to the pump. Such means includes pneumatic flow control valves 54 and 56 respectively connected between ports 38 and 40 of valve 36 and a respective end of the cylinder of motor 28, each of valves 54 and 56 serving to establish a pressure differential between the corresponding side of the piston in the cylinder and the respective outlet port of pneumatic valve 36. The means for sensing occurrence of the change in force advantageously can be formed of the mounting of motor 28, which mounting is provided in the form of a mechanical linkage means which permits constrained motion of mounting motor 28 relative to frame 48. To this end such linkage means includes locking arm 58 rigidly connected to motor 28, arm 58 being rotatably connected, as by a pivot, to respective first ends of elongated links 60 and 61, the opposite ends of links 60 and 61 being in turn rotatably or pivotally connected to frame 48. Links 60 and 61, arm 58, motor 28 and frame 48 are so arranged and disposed to support motor 28 while permitting it a limited amount of motion away from pump 20, for example substantially along the long axis of rod 29. One end of arm 58 is connected to an upper portion of frame 48 through compression spring 62 which normally serves to bias motor 28 toward pump 20. The biasing force of spring 62 is adjustable by manual manipulation of adjusting rod 64. It will be appreciated that many other means could be alternatively provided for mounting motor 28 to permit a similar relative movement with respect to pump 20. For example, the motor could be connected to a pair of slides mounted on rails coupled to the frame, the slides being spring biased toward the pump.

Mounted on the opposite end of arm 58 is finger 66 which projects substantially normally to the constrained path of motion of motor 28. Mounted on frame 48 and disposed to intersect the path of movement of finger 66 at a point when motor 28 has moved a predetermined distance away from pump 20, is actuator button 67 of dilution valve 68. Valve 68 is connected to control the flow of alterant, such as water, between input line 70 and output line 72, the latter being disposed to discharge into reservoir 26. When motor 28 is in its unmoved position, finger 66 is in contact with stop block 69 that blocks motion of links 60 and 61, arm 58 and motor 28 toward pump 20.

In operation, gas such as air introduced through valve 31 and regulator 32 into line 30 is distributed by valve 36 to either port 38 or port 40. The pressure of air from line 30 transferred to ports 38 or 40 at, for example sixty pounds, is reduced by restrictor valve 54 or by valve 56, as the case may be, to thirty pounds, for example. This latter pressure, applied to the respective side of the piston in motor 28, drives the piston in one direction until arm 52 contacts the appropriate one of the actuators on pilot valves 44 and 45, reversing the flow of air into valve 36 and, in turn, reversing the direction of movement of the piston in motor 28. As is well known, reciprocation of the piston in motor 28 flexes the diaphragm in pump 20 substantially normally to its plane so that when flexed in one direction, material from body 25 (hereinafter for purposes of exposition referred to as glue) is aspirated or pulled through intake valve 21 into an internal chamber in the pump, and when flexed in the opposite direction, the glue is forced out of the chamber through discharge valve 23 into outlet pipe 24. This action of the air-cylinder motor 28, diaphragm pump 20 and pilot-operated two-position, four-way valve 36 is well known in the art.

It will be seen that for a given consistency for the glue, and for predetermined pressure differentials normally provided by valves 54 and 56, the compression of spring 62 can be set so that during pumping, motor 28 remains in a substantially fixed position relative to frame 48, because the forces acting on spring 62 are just equal and opposite to the forces acting to pump the glue.

As earlier noted, if the consistency of the glue changes, to maintain the same pumped volume, the force applied to the glue must also change accordingly. Thus, if the glue becomes, for example more viscous, its resistance to being pumped will increase. Because the resistance of the glue to being pumped increases, motor 28 will tend to slow, permitting the pressure of the pneumatic fluid within the cylinder in motor 28 to increase toward the sixty pound output value provided at the output ports of valve 36. Thus, the pressure differential provided by valves 54 and 56 becomes smaller. The increased pressure within the cylinder of motor 28 not only tends to force the motor piston to drive the more resistant glue, but disturbs the preset equilibrium between the spring forces and the pumping forces so that the motor will tend to be driven away from pump 20 until spring 62 is compressed sufficiently to again balance the opposing forces. The movement of motor 28 against the bias of spring 62 causes finger 66 to contact actuator button 67 of valve 68, opening the latter so as to introduce a flow of alterant (in this case, water) into body 25. Known mixing devices are preferably provided to insure that the alterant, when introduced, becomes quickly well mixed with the other material in reservoir 26 so as to provide body 25 with a substantially homogeneous consistency.

Of course, as soon as the thinned glue from reservoir 26 is sucked into pump 20, it exhibits a reduced resistance to pumping so that motor 28 will tend to speed up. The decreased time for the pneumatic fluid to flow through valves 54 and 56, thus causes the pressure differential provided by valves 54 and 56 to increase, disturbing the new equilibrium between the spring forces and the pumping forces so that the motor will tend to be driven toward pump 20 until the compression on spring 62 is reduced sufficiently to again balance the opposing forces. This movement of motor 28 with the bias of spring 62 breaks the contact between finger 66 and actuator button 67 of valve 68, closing the latter so as to arrest the flow of alterant into reservoir 26.

Since certain changes may be made in the above-described system without departing from the scope of the invention involved, it is intended that all matter contained in the above description or shown in the accompanying drawing shall be interpreted in an illustrative and not in a limiting sense.

What is claimed is:

1. Apparatus for controlling the consistency of a material pumped from a reservoir by introducing an alterant into said material, said apparatus comprising, in combination:
    positive displacement pump means for applying force at some predetermined level to said material so as to pump the latter from said reservoir at a predetermined flow rate;
    means for sensing change in the force applied to said material by said pump means when the latter is driven to pump said material from said reservoir;
    first valve means for controlling introduction of said alterant into said material; and
    means for controlling operation of said first valve means responsively to the sensing of change in the force required to pump said material.

2. Apparatus as defined in claim 1 wherein said pump is a diaphragm-type pump.

3. Apparatus as defined in claim 1 wherein said pump means comprises means for driving said positive displacement pump.

4. Apparatus as defined in claim 1 wherein said means for driving comprises a cylinder containing a reciprocable piston, a source of pneumatic fluid at a predetermined pressure, pneumatic valve means connected to said source and to said cylinder and being operable for alternately applying pneumatic fluid from said source to opposite sides of said piston to drive said piston in reciprocation, and means for connecting said piston to said positive displacement pump.

5. Apparatus as defined in claim 4 wherein said means for driving is a double-acting pneumatically operated cylinder.

6. Apparatus as defined in claim 5 wherein said pneumatic valve means is a pilot-operated two-position, four-way type of valve.

7. Apparatus as defined in claim 4 wherein said means for sensing change in the force applied to said material by said pump means comprises a pneumatic flow restrictor valve connected so as to create a pressure differential between one side of said piston and said pneumatic valve means.

8. Apparatus as defined in claim 7 wherein said means for controlling operation of said first valve means comprises:
    means mounting said cylinder for movement responsively to change in said pressure differential;
    means coupling movement of said cylinder to said first valve means for operating the latter; and
    resilient means for exerting a force on said cylinder that tends to be substantially equal and opposite to the force acting on said cylinder by said pump during pumping.

9. Apparatus for controlling the consistency of a material pumped from a reservoir, by introducing an alterant into said material, said apparatus comprising, in combination:
    a pump for pumping said material;
    an air cylinder motor coupled for driving said pump;
    control valve means connected for controlling introduction of driving air into said motor;
    means for sensing change in the force applied to said material by said pump when the latter is driven to pump said material from said reservoir;
    means for resiliently mounting said motor for relative movement substantially toward or away from said pump responsively to said change, so that under steady-state conditions of said consistency, a substantial equilibrium exists between force acting to create said relative movement and the force applied to said motor by said means for resilient mounting, which equilibrium will be disturbed by a change in said consistency; and
    alterant valve means operable responsively to said relative movement of said motor responsively to said change so as to control the introduction of said alterant into said material.

10. Apparatus as defined in claim 9 wherein said pump comprises:
    a diaphragm-type pump for pumping said material;
    said motor comprises a double-acting air cylinder motor coupled for driving said pump;
    said control valve means comprises a pilot-operated two-position, four-way type of valve connected for controlling introduction of driving air into said motor; and
    said means for sensing change comprises reducing valves connected between said two-position valve and said motor for providing, during steady state-operation of said pump, a pressure differential between the air supplied to drive said motor and the air in said motor, so that said motor is movable in said mounting means responsively to changes in said pressure differentials due to change in said consistency;
    said alterant valve means being responsive to movement of said motor responsively to said change in pressure differentials.

11. Apparatus as defined in claim 10 wherein said means for resiliently mounting said motor comprises a compression spring disposed so as to tend to maintain said equilibrium.

12. Method of controlling the consistency of a material pumped from a reservoir by introducing an alterant into said material, said method comprising the steps of:

applying force with a postive displacement pump driven in reciprocation at some predetermined level to said material so as to pump the latter from said reservoir at a predetermined flow rate;

sensing change in the force applied to said material by said pump means to pump said material from said reservoir; and controlling introduction of said alterant into said material responsively to said sensing of change in said force required to pump said material.

13. Method as defined in claim 12 wherein said force is applied by a pump driven by a motor;

said method including the steps of so resiliently mounting said motor for relative movement substantially toward or away from said pump responsively to said sensing of said change that under steady-state conditions of said consistency, a substantial equilibrium exists between force acting to create said relative movement and the force applied to said motor by said resilient mounting, which equilibrium will be disturbed by a change in said consistency so as to cause said relative movement which acts to control introduction of said alterant.

* * * * *

UNITED STATES PATENT AND TRADEMARK OFFICE
CERTIFICATE OF CORRECTION

PATENT NO. : 4,865,067
DATED : September 12, 1989
INVENTOR(S) : John B. Duquette It is certified that error appears in the above-identified patent and that said Letters Patent is hereby corrected as shown below:

Claim 12, column 7, line 10, delete "postive" and substitute therefor -- positive --.

Signed and Sealed this

Seventh Day of August, 1990

Attest:

HARRY F. MANBECK, JR.

*Attesting Officer*  *Commissioner of Patents and Trademarks*